UNITED STATES PATENT OFFICE.

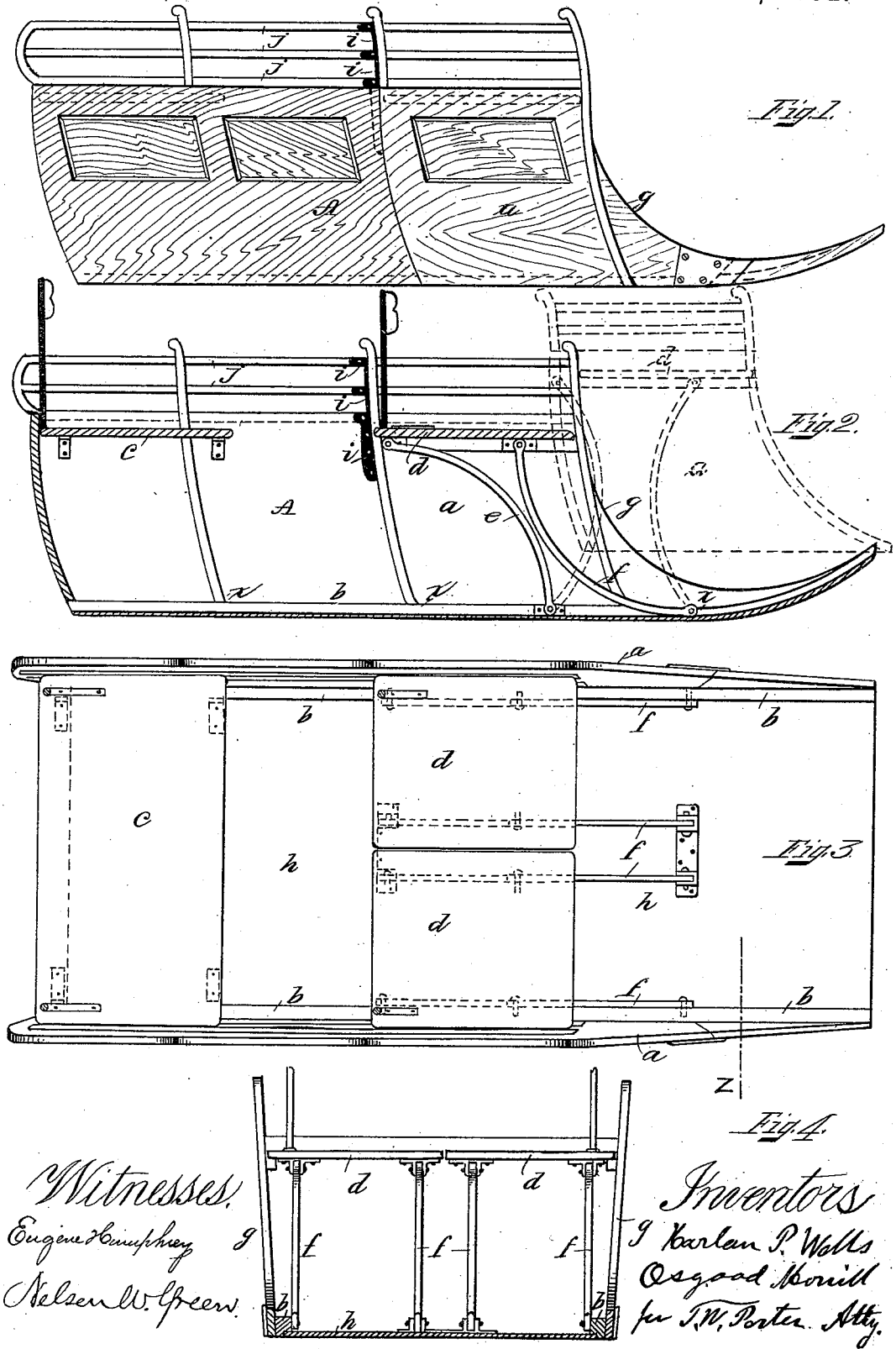

HARLAN P. WELLS AND OSGOOD MORRILL, OF AMESBURY, MASSACHUSETTS.

CARRIAGE.

SPECIFICATION forming part of Letters Patent No. 471,157, dated March 22, 1892.

Application filed May 5, 1891. Serial No. 391,615. (No model.)

*To all whom it may concern:*

Be it known that we, HARLAN P. WELLS and OSGOOD MORRILL, of Amesbury, in the county of Essex and State of Massachusetts, have invented a new and useful Improvement in Carriages, which will, in connection with the accompanying drawings, be hereinafter fully described, and specifically defined in the appended claims.

In said drawings, Figure 1 is a side elevation of a vehicle-body embodying our invention. Fig. 2 is a sectional elevation of the same body, the section being longitudinal and vertical and the view as from the right-hand side of the vehicle. Fig. 3 is a top plan view of a body corresponding to that shown in Figs. 1 and 2. Fig. 4 is a sectional elevation, the section being taken on line Z, Fig. 3, and the view as from the right in that figure.

The object of our invention is to produce a two-seated vehicle-body in which the longitudinally-divided front seat is permanently secured to a corresponding section of the side panels of the body and is provided with a set of jumping-irons for each section, so that upon whichever side of the vehicle a passenger on the rear seat desires to enter or leave it it is only necessary to jump forward the section of the front seat on that side to thereby open an unobstructed passage on that side to and from the rear seat, all as will be next hereinafter described and afterward claimed.

Referring again to said drawings, A represents the side of the body, which may be of such style and proportion as may be deemed best adapted for the embodiment of our invention.

The rear seat is shown at $c$ and the front seat at $d\,d$, which indicate the two halves into which this seat is divided. The short sections or parts $a$ of the side panels are secured permanently to the respective halves $d$ of the front seat, so as to move with the latter as they are jumped back and forth. Each of said sections $d$ of the front seat is provided with two pairs of jumping-irons, consisting of the rear irons $e$ and the front irons $f$, which are pivoted at their lower ends in ear-plates secured to floor $h$ and by pivots to the sills $b$, and at their upper ends pivoted to like plates secured to the bottom of the seat in a manner too well known to require further particularizing. Said rear irons $e$ are at their middle curved forward to be out of the way of the legs of the occupants of the rear seat, while front irons $f$ are curved to rear to correspond with the cut-down curve $g$ of the side panels of the body. When the side rails $j$ are employed, a suitable iron $i$ is secured to them where they are cut through above the dividing-line between the main panel A and the forward section $a$, said iron being at its lower portion secured to the main part of the body, so as to secure in place and support the rails where they would be otherwise unsupported.

In Fig. 2 is shown by dotted lines the position of the front seat when jumped forward, and also the resulting space between the front end of main panel A and the rear end of the short section $a$ of the panel through which passengers may readily pass to and from the rear seat. It will be obvious that the driver can without leaving the front seat jump forward the half of the front seat on the side which a passenger desires to enter or leave the rear seat, thereby affording free passage to or from the rear seat.

We are aware that jumping front seats are not new. We are also aware that longitudinally-divided front seats are old and well known, and we are also aware that front seats so divided have been arranged to be turned forward upon irons rigidly secured to the seat and pivoted to the body. Hence we make no claim to either of these features as such, our invention consisting in substance in a carriage-body having a front and rear seat, the former being permanently secured to movable sections of the body sides and longitudinally divided and having each half provided with jumping-irons upon which it may be jumped forward while maintaining a level position, so as to give space between it and the rear seat for occupants of the latter to enter and leave the same.

Hence we claim as our invention—

1. In a two-seated carriage, a front seat divided in the longitudinal line of the body and having a movable section of the body side permanently secured to said halves, respectively, and a set of jumping-irons for each said sections of the seat, the same being pivotally attached to the body and seat at their respective ends, whereby the sections of the seat and the sections of the body thereto attached may be jumped forward without turning forward, substantially as specified.

2. In a two-seat carriage, a front seat divided in halves $d$ $d$ and having sections $a$ $a$ of the body side secured to their outer ends, and the jumping-irons $e$ $f$, pivotally attached to the body and seat sections at their respective ends, substantially as specified.

HARLAN P. WELLS.
OSGOOD MORRILL.

Witnesses:
GEORGE H. BRIGGS,
DELL W. DOLBUR.